United States Patent [19]

Inaba et al.

[11] Patent Number: 4,488,746
[45] Date of Patent: Dec. 18, 1984

[54] DOUBLE HAND WITH A THROUGH HOLE

[75] Inventors: Hajimu Inaba, Hino; Shinsuke Sakakibara, Kunitachi; Ryo Nihei, Musashino, all of Japan

[73] Assignee: Fujitsu Fanuc Limited, Hino, Japan

[21] Appl. No.: 387,840

[22] PCT Filed: Oct. 7, 1981

[86] PCT No.: PCT/JP81/00269

§ 371 Date: Jun. 4, 1982

§ 102(e) Date: Jun. 4, 1982

[87] PCT Pub. No.: WO82/01157

PCT Pub. Date: Apr. 15, 1982

[30] Foreign Application Priority Data

Oct. 8, 1980 [JP] Japan ............................ 55-142632[U]

[51] Int. Cl.³ .................... B66C 1/10; B25J 15/00
[52] U.S. Cl. ................... 294/86 R; 414/732; 414/735
[58] Field of Search .......... 294/86 R, 88, 106, 103 R, 294/115; 414/735, 732, 739, 753, 728, 741, 1, 2, 3, 4, 5, 6

[56] References Cited

U.S. PATENT DOCUMENTS 3,809,255 5/1974 Koch et al. ................... 414/732
4,352,620 10/1982 Inaba et al. ................... 414/732

FOREIGN PATENT DOCUMENTS 48-51460 7/1973 Japan ................... 414/732
52-11813 4/1977 Japan ................... 414/732
54-12863 6/1979 Japan ................... 414/732

Primary Examiner—James B. Marbert
Attorney, Agent, or Firm—Armstrong, Nikaido, Marmelstein & Kubovcik

[57] ABSTRACT

A double hand applicable to an industrial robot comprises two hand units (2, 3) comprising at least two pairs, one each, of fingers (2-1 and 2-2, 3-1 and 3-2) and plate members (2-3, 3-3) of a pressing unit (4) disposed in parallel along the center axis of the fingers. The hand units (2, 3) are connected through a pressing mechanism (4) to constitute a double hand in a manner that the respective gripping center axis of the two hand units are in alignment, the respective plate members (2-3, 3-3) of the pressing unit are disposed opposite to each other and the opening sides of the respective pairs of fingers of the two hand units are directed in opposite directions to each other. An opening (6) for allowing a workpiece to penetrate through the plate members is provided for each of the plate members (2-3, 3-3) of the pressing unit attached to the hand units (2, 3) respectively coaxially with the gripping center axis so that both hand units (2, 3) are allowed to move freely relative to the workpiece gripped by the hand units (2, 3) along the gripping center axis.

2 Claims, 6 Drawing Figures

DOUBLE HAND WITH A THROUGH HOLE

DESCRIPTION

1. Field of the Invention

This invention relates to an industrial robot employed for loading and unloading a workpiece to a machine tool, more particularly to an improved workpiece-gripping double hand of an industrial robot.

2. Background Art

In loading a workpiece on the chuck of a machine tool, for example, a lathe, and unloading the machined workpiece from the chuck by the use of an industrial robot, a double hand, in general, is used in order to reduce the loading and unloading time.

A double hand comprises two parallely disposed hand units of approximately analogous construction connected by a pressing mechanism. The plate members of the pressing mechanism are interposed between the fingers of one hand unit and the fingers of the other hand unit.

In machining a workpiece on a lathe or another machine tool, it is often necessary to machine one end of the workpiece first, and then to chuck the workpiece again at the machined end to machine the other end. In such a machining procedure, a conventional double hand is inverted after unloading a machined workpiece and placing the same on a table and then grip the workpiece again. This conventional procedure is disadvantageous since changing the grip requires a long time.

DISCLOSURE OF THE INVENTION

It is an object of the present invention to eliminate this disadvantage of conventional double hands and to provide a double hand of a construction capable of performing the change of grip easily and in a short time. According to the present invention, the object of the invention is attained by providing an opening for the plate member of each hand unit of a double hand with the center of the opening being coincident with the center axis of workpiece gripping.

BEST MODE OF CARRYING OUT THE INVENTION

Figure 1:
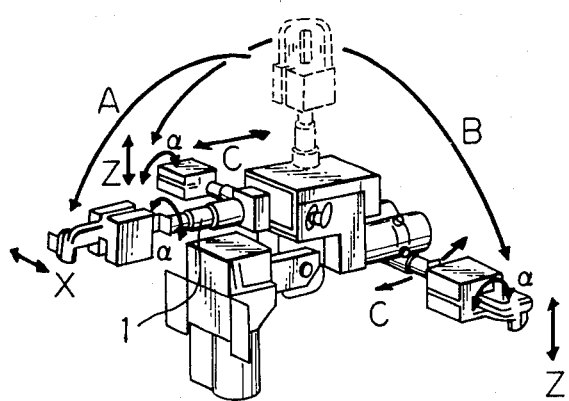
FIG. 1 is a perspective view of an industrial robot to which the double hand of the present invention is preferably applied.

Referring to FIG. 1 illustrating, in a perspective view, an industrial robot to which a double hand of the present invention is suitably applicable, the arm of the industrial robot is adapted to be controlled by a servomechanism so as to perform a horizontal linear motion along the X-axis, swiveling motion in a vertical plane along the course A between the horizontal position and the vertical position, twisting motion in a vertical plane from the vertical position along the course B, vertical linear motion along the Z-axis, and swiveling motion in a horizontal plane along the course C. The turning motion of the wrist part about the $\alpha$-axis can selectively be controlled between 0°/90° and 0°/180° turning positions by means of ON/OFF control.

Figure 2:
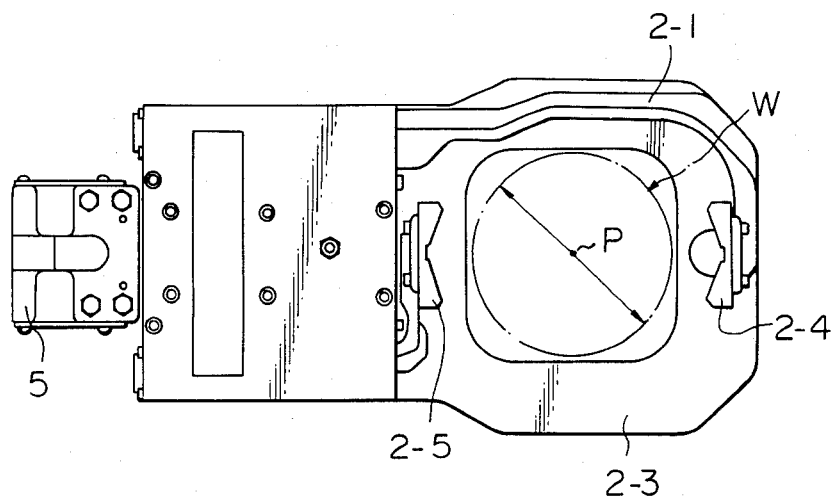
FIG. 2 is a side elevation of a double hand of the present invention.
Figure 3:
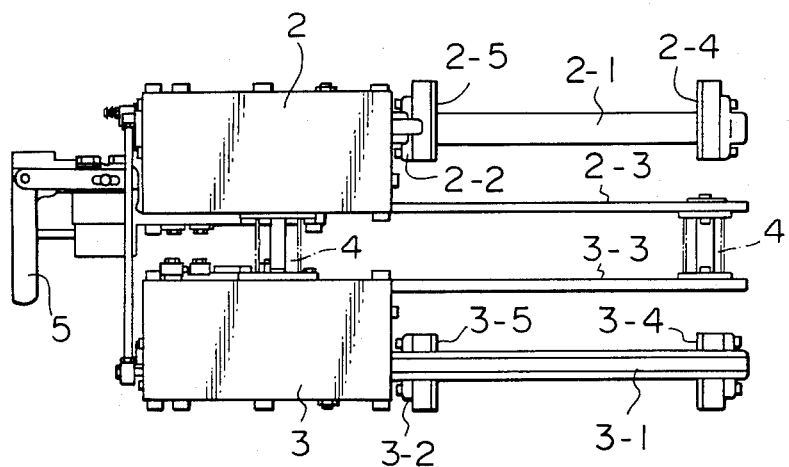
FIG. 3 is a top plan view of the double hand of FIG. 2.

FIGS. 2 and 3 are a side elevation and a top plan view, respectively, of a double hand of the present invention. Referring to FIGS. 2 and 3, the double hand comprises paired stationary hand unit 2 and pressing hand unit 3 constituting the double hand, a pair of fingers 2-1 and 2-2 of the stationary hand unit 2, a plate member 2-3 of a pressing unit, a pair of fingers 3-1 and 3-2 of the pressing hand unit 3, gripping tips (claws) 2-4, 2-5, 3-4 and 3-5, and a plate member 3-3 of the pressing unit. Reference numbers 4 and 5 designate a pressing mechanism and a hand fitting lug attached to the stationary hand unit 2, respectively. The hand units 2 and 3 have flat gripping surfaces which are oriented perpendicularly to the gripping center axis P of the fingers, are disposed in parallel along the gripping center axis P with a predetermined distance between them, and are interlinked by the pressing mechanism 4. In the drawing, a symbol W designates a workpiece.

Figure 4:
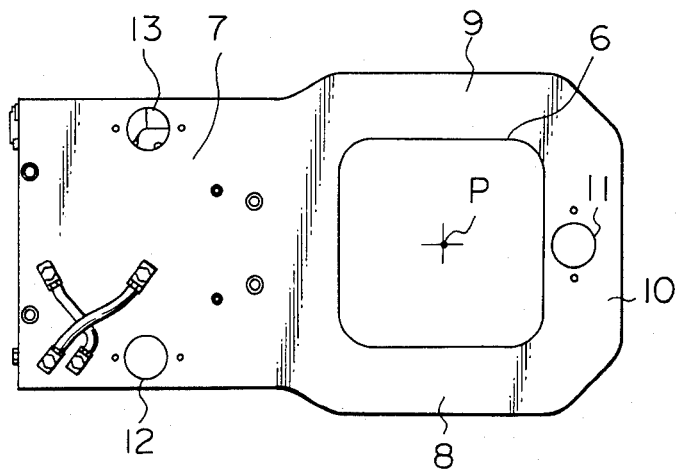
FIG. 4 is a side elevation of a plate member of the pressing unit.

FIG. 4 is a side elevation of the plate members 2-3 and 3-3 of the pressing unit. Each plate member is provided with an opening 6 coaxial with the gripping center axis P for allowing a workpiece to penetrate through the plate member, thus each plate member is formed as an integrated member consisting of a base section 7, connecting sections 8 and 9, and a front end section 10. At the central part of the front end section 10 and near the horizontal edges of the base section 7, fitting holes 11 and, 12 and 13, respectively, for fitting the pressing mechanism are formed.

Figure 5:
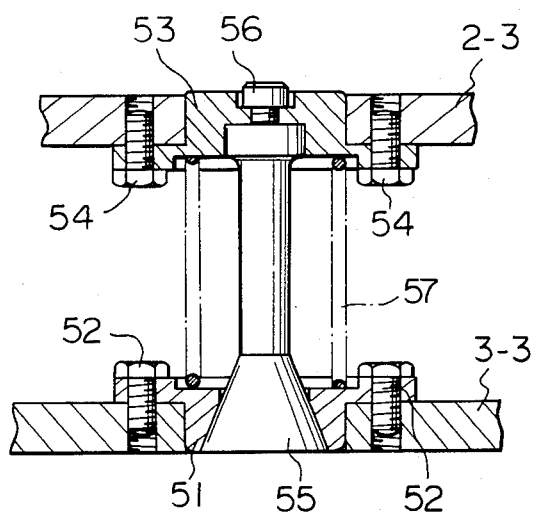
FIG. 5 is a sectional view of the pressing mechanism.

FIG. 5 illustrates the constitution of three pressing mechanisms 4 disposed between the stationary hand unit 2 and the pressing hand unit 3 of FIG. 2.

A taper head 51 is fixed to the plate member 3-3 of the pressing unit 3 with bolts 52, while a head 53 is fixed to the plate member 2-3 of the stationary hand unit 2 with bolts 54. The upper end of a taper-head rod 55 inserted through and from below the taper head 51 is fixed to the head 53 with a bolt 56. A helical spring 57 is provided between the taper head 51 and the head 53 coaxially with the taper-head rod 55. Thus the plate member 3-3 of the pressing hand unit is stably positioned with the taper part of the taper-head rod 55 firmly fitted in the taper hole of the taper head 51 by the action of the spring 57. When a pressing force is applied to the pressing plate member 3-3 toward the plate member 2-3, the taper head 51 is raised against the force of the spring 57 so that the taper fitting is loosened and the pressing plate member 3-3 is released free relative to the stationary plate member 2-3.

Figure 6:
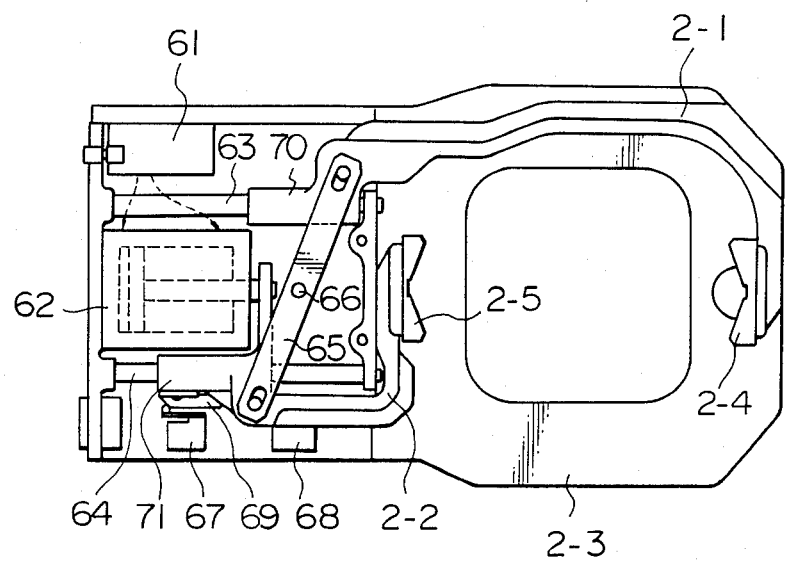
FIG. 6 is a side elevation of the driving mechanism of the hand unit.

FIG. 6 illustrates the driving mechanism of the stationary hand unit 2. The driving mechanism of the pressing hand unit is identical in construction with that of the stationary hand unit.

Referring to FIG. 6, the driving mechanism comprises an electromagnetic vlave 61, an air cylinder mechanism 62, guide rods 63 and 64, a link 65, a pivot shaft 66, limit switches 67 and 68, a dog 69, and the respective bosses 70 and 71 of the fingers.

The fingers of the stationary hand 2 are in a fully open state in FIG. 6, in which the dog 69 actuates the limit switch 67, thus confirming the fully open state of the fingers. When the piston rod of the air cylinder mechanism 62 is pushed out by changing-over the electromagnetic valve 61, the boss 71 of the finger 2-1 connected to the piston rod is moved rightward and the link 65 is turned on the pivot shaft 66 so that the boss 70 of the finger 2-1 is moved leftward along the guide rod 63, thus the fingers 2-1 and 2-3 are moved toward the respective fully closed positions. The limit switch 68 detects the fully closed state. When the electromagnetic valve is changed-over to the opposite position, those component of the mechanism are moved in the opposite directions so that the fingers 2-1 and 2-2 return to the respective positions as shown in FIG. 6.

It is obvious from what has been described hereinbefore that the double hand according to the present invention is capable of gripping a workpiece, placing the workpiece on a table with the center axis of the workpiece directed vertically, and then moving freely with respect to the workpiece along the center axis of the workpiece (the gripping center axis) even when the two hand units are disposed in parallel along the gripping center axis, since openings for allowing a workpiece to penetrate through the plate members of the pressing unit are provided for the plate members. Therefore, the change of workpiece gripping position can simply and easily be attained through the vertical movement of the hand, which is advantageous for the change of workpiece gripping position. Furthermore, since the base section, front end section, and the connecting sections of the plate member are integrated into a single piece, each plate member is sufficiently rigid and will not adversely effect the function of the pressing mechanism.

We claim:

1. A double hand for an industrial robot, comprising a stationary and a pressing hand unit, each hand unit comprising at least a pair of fingers and a plate member disposed between said hand units, said plate members being disposed in parallel with said fingers of said corresponding hand unit along the gripping center axis of said fingers, said pressing hand unit being flexibly connected to said stationary hand unit such that the respective gripping center axis of said two hand units are in alignment, said plate members of said pressing hand unit and stationary hand unit being disposed opposite to each other and the opening sides of the respective pairs of fingers of said stationary and pressing hand units being directed in opposite directions, wherein an opening is provided in each of said plate members to allow the workpiece to pass through said plate members coaxially with the respective gripping center axis of both said hand units.

2. A double hand, as set forth in claim 1, wherein each of said plate members comprises a base section, a front end section and two connecting sections which are integrated into a single piece surrounding said opening for allowing a workpiece to penetrate through said plate members.

* * * * *